United States Patent
McElroy, II et al.

(10) Patent No.: US 11,312,088 B2
(45) Date of Patent: Apr. 26, 2022

(54) MODULAR CARRIAGE ASSEMBLY FOR THE FUSION OF POLYOLEFIN PIPES

(71) Applicant: McElroy Manufacturing, Inc., Tulsa, OK (US)

(72) Inventors: Arthur H. McElroy, II, Tulsa, OK (US); Jason A. Lawrence, Owasso, OK (US); Seth P. Ahrens, Tulsa, OK (US); Paul John Donaldson, Broken Arrow, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 563 days.

(21) Appl. No.: 16/135,306

(22) Filed: Sep. 19, 2018

(65) Prior Publication Data

US 2019/0210297 A1    Jul. 11, 2019

Related U.S. Application Data

(60) Provisional application No. 62/561,008, filed on Sep. 20, 2017, provisional application No. 62/560,666, filed on Sep. 19, 2017.

(51) Int. Cl.
*B29C 65/00* (2006.01)
*B29C 65/78* (2006.01)
(Continued)

(52) U.S. Cl.
CPC .......... *B29C 66/5221* (2013.01); *B25B 5/061* (2013.01); *B25B 5/062* (2013.01);
(Continued)

(58) Field of Classification Search
CPC ......... B25B 5/061; B25B 5/062; B25B 5/064; B25B 5/147; B25B 5/14; B66F 9/184;
(Continued)

(56) References Cited

U.S. PATENT DOCUMENTS 3,729,360 A * 4/1973 McElroy ............. B29C 66/8652
156/499
3,789,493 A    2/1974 Province
(Continued)

FOREIGN PATENT DOCUMENTS

DE    2734910 B1    9/1978

OTHER PUBLICATIONS

International Search Report prepared by the European Patent Office as the ISA in PCT/US2018/051747 dated Feb. 12, 2019.
(Continued)

*Primary Examiner* — Orlando E Aviles
*Assistant Examiner* — Robert F Neibaur
(74) *Attorney, Agent, or Firm* — GableGotwals

(57) ABSTRACT

Modular carriage for varying spacing between ends of polymer pipe during fusion. The modular carriage includes a fixed jaw; an inner movable jaw; an outer moveable jaw and a plurality of guide rods. The fixed jaw being adapted for tool free engagement with the terminal ends of the plurality of guide rods. A carriage cylinder is associated with at least two of the guide rods and mounted for reciprocal travel along the length of its associated guide rod. The movable jaws being adapted for tool free engagement with at least two carriage cylinders for reciprocal travel therewith. A combined hydraulic cylinder/guide rod includes a guide rod with an integral guide rod piston, a cylindrical tube, and a guide rod gland on each end of the cylinder tube.

21 Claims, 20 Drawing Sheets

(51) Int. Cl.
  *B25B 5/06*    (2006.01)
  *B29C 65/02*   (2006.01)
  *B25B 5/14*    (2006.01)
  *B29L 23/00*   (2006.01)
  *F16L 1/10*    (2006.01)
  *F16L 47/02*   (2006.01)
(52) U.S. Cl.
  CPC .............. *B25B 5/064* (2013.01); *B25B 5/147* (2013.01); *B29C 65/02* (2013.01); *B29C 65/7841* (2013.01); *B29C 66/71* (2013.01); *B29C 66/73921* (2013.01); *B29C 66/8242* (2013.01); *B29C 66/1142* (2013.01); *B29L 2023/22* (2013.01); *F16L 1/10* (2013.01); *F16L 47/02* (2013.01)
(58) Field of Classification Search
  CPC . B29C 9/184; B29C 66/5221; B29C 66/8242; B29C 66/71; B29C 66/73921; B29C 66/1142; B29C 66/522; B29C 65/78; B29C 65/782; B29C 65/7841; B23Q 3/00; B23Q 3/06; B23P 11/00; B23P 11/005; F16L 1/10; F16L 1/09; Y10T 29/53796; Y10T 29/53678
  USPC ............. 269/35, 32, 24, 284, 237, 238, 239, 269/243.55; 156/304.2, 304.6; 29/238, 29/239
  See application file for complete search history.

(56) References Cited

U.S. PATENT DOCUMENTS

| | | | | |
|---|---|---|---|---|
| 4,352,708 A | * | 10/1982 | McElroy | B29C 66/1142 |
| | | | | 156/378 |
| 5,743,992 A | | 4/1998 | Weimer et al. | |
| 5,814,182 A | | 9/1998 | McElroy, II et al. | |
| 5,830,312 A | * | 11/1998 | Weimer | B29C 66/73921 |
| | | | | 156/503 |
| 5,843,271 A | * | 12/1998 | Andrew | B29C 66/73921 |
| | | | | 156/499 |
| 2010/0090453 A1 | * | 4/2010 | Bortoli | B29C 66/865 |
| | | | | 280/789 |

OTHER PUBLICATIONS

European Examination Report issued for EPO Application No. 18 826 840.3 dated Jun. 15, 2021.

* cited by examiner

MODULAR CARRIAGE ASSEMBLY FOR THE FUSION OF POLYOLEFIN PIPES

CROSS-REFERENCE TO RELATED CASES

This application claims the benefit of U.S. provisional patent application Ser. No. 62/560,666, filed on Sep. 19, 2017 and U.S. provisional patent application Ser. No. 62/561,008, filed on Sep. 20, 2017, and incorporates such provisional application by reference into this disclosure as if fully set out at this point.

FIELD OF THE INVENTION

The present invention relates to carriage assemblies for fusing two ends of polymer pipe.

SUMMARY

The carriage of the present disclosure is part of a fusion system that is designed to be modular and light weight in order to easily use in tight spaces. The disclosure includes a modular carriage where the jaws are removable preferably without the requirement of tools in order to allow the carriage to be assembled on existing pipe that is in place in the rafters or running up a wall of a structure. For the purpose of exemplification, and not limitation, the carriage of the present disclosure may be sized to accommodate six different sizes of pipe for which butt fusion is required: 1) 355 mm; 2) 400 mm; 3) 450 mm; 4) 500 mm; 5) 560 mm; or 6) 630 mm.

Each of these exemplary sizes requires its own size jaws and guide rod support. The hydraulic cylinders and guide rods of the present disclosure are able to be used on all sizes of the carriage system for the above examples. This allows a cost reduction and increase in the flexibility of the fusion system. This increased flexibility is characterized by the ability to:

1.) Break the unit down for easier storage and shipment;
2.) Customize the particular carriage assembly for a particular work space size and pipe size requirement;
3.) Customize the equipment sent to a job site in order to limit unnecessary parts;
4.) Move the carriage with ease in buildings and other structures;
5.) Assemble the carriage at the site of use of the carriage and particularly in work/pipe locations that are too tight for the use of a conventional fusion machine.

Additional benefits of the modular carriage of the present disclosure include:

1.) Reduced weight of components that must be transported to/moved and/or lifted to the location of the pipe fusion;
2.) The modular design allows for the carriage of the present disclosure to be assembled directly on existing pipes that are already in place;
3.) Having a jaw for each size of pipe reduces the required spatial envelope for the carriage which allows the machine to fuse pipes that are spaced much closer to each other;
4.) Allows the possibility for reduced shipping size as the component (modular) parts are able to be disassembled and nested in shipping packaging.

The carriage of the present disclosure is configurable so that the right size tools for any specific fusion requirement on a job site, even when different sizes of pipes are presented.

The carriage assembly of the present disclosure includes in one embodiment, generally, a fixed jaw; moveable inner jaw and moveable outer jaw, and a guide preferably for each size of pipe. In addition, a combined hydraulic carriage cylinder and associated guide rod may be included. In this embodiment the hydraulic carriage cylinder/guide rod; a guide rod cap, and a guide rod sleeve may also be provided and be the same and employed with all pipe and jaw sizes. In an alternate preferred embodiment, a fourth, fixed jaw is added for increased stability.

The modular carriage of the present disclosure is adaptable for varying spacing between ends of polymer pipe during fusion. The present modular design allows for many different sizes of pipe to be fused with the same fusion apparatus without the use of inserts. As set forth above, the modular carriage includes in a basic embodiment a fixed jaw; an inner and outer movable jaw; and a plurality of guide rods. The fixed jaw is adapted for tool free engagement with the plurality of guide rods. A carriage cylinder is associated with each of at least two of the guide rods. The carriage cylinder may be mounted for reciprocal travel on its associated guide rod. Each movable jaw is adapted for tool free engagement with a cylinder for reciprocal travel therewith. Each moveable jaw is preferably adapted for engagement with at least two carriage cylinders for alignment and stability purposes.

The guide rods each include a longitudinal axis. Each associate carriage cylinder also includes a longitudinal axis which is concentric with the longitudinal axis of its associated guide rod.

A guide rod support is adapted for tool free engagement preferably with at least two of the plurality of guide rods. A latching assembly is operable to secure the guide rod support to the guide rods by tool free engagement. The movable jaws include at least two latching assemblies being operable to secure each movable jaw to at least two carriage cylinders by tool free engagement.

The fixed jaw includes at least two latching assemblies being operable to secure the fixed jaw to at least two guide rods by tool free engagement.

The plurality of guide rods are each substantially cylindrical with an external surface and an internal surface. The guide rods each include a first end and a second end. A guide rod sleeve is positioned at least partially over the external surface of each guide rod adjacent its first end. The fixed jaw is secured to the plurality of guide rods adjacent their first end. A guide rod cap is in contact with (threaded into) the internal surface at the first end. The fixed jaw is positioned between the guide rod sleeve and the guide rod cap and secured by the latching mechanism.

Each guide rod sleeve may include a shoulder for retaining the guide rod sleeve adjacent the first end of its respective guide rod.

Each carriage cylinder may be hydraulically actuated for reciprocal travel on its associated guide rod. Each of the plurality of guide rods has a length and each carriage cylinder has a length and two ends. Each carriage cylinder may surround its associated guide rod. The length of each carriage cylinder is less than the length of its associated guide rod so as to allow reciprocal hydraulic travel of each carriage cylinder along the length of its associated guide rod.

Each carriage cylinder may include a rod gland at each end. Each rod gland is operable to hydraulically seal the carriage cylinder at each end. The rod gland surrounds its associated guide rod. Each rod gland includes a channel for receiving and supporting a movable jaw. As stated previously, in one embodiment there are two moveable jaws, an inner moveable jaw and an outer moveable jaw. In a preferred embodiment each moveable jaw is supported.

A latching mechanism secures the moveable jaws. The movable jaw is secured in the channel by the latching mechanism. In a preferred arrangement the latching mechanism is a lock over (also known as a cam over) clamp. Thus, the movable jaws are secured to the rod glands by tool free engagement.

The rod glands are mounted on the carriage cylinder so as to maintain the first movable jaw and the second movable jaw in a parallel orientation. A movable jaw (inner or outer) is secured to a rod gland at each opposing end of each of at least two guide rods. In one embodiment, two carriage cylinders, one of each of the at least two guide rods are positioned substantially parallel to one another.

The carriage cylinder of the present invention may employ a cylinder assembly which may be of a known design. The cylinder may be powered in any known manner, such as pneumatically, or hydraulically.

One particularly suited cylinder design, however, includes a combination hydraulic cylinder/guide rod of the present disclosure. The cylinder includes in one embodiment a guide rod; cylinder tube; a rod gland on each end of the cylinder tube; and a plurality of the rods extending between the rod glands.

The piston includes an internally ported body with machined in sealing features for proper hydraulic functions.

The hydraulic cylinder tube is preferably a composite tube for encasing the hydraulic cylinder. The rod gland on each end of the cylinder tube seals on the cylinder rod and cylinder tube and seals the cylinder tube. The rod gland also pilots on the cylinder bore to properly align the carriage jaws. The tie rods connect the two rod glands at the ends of the cylinder tube.

The guide rod of the present disclosure in one embodiment includes three separate elements that are preferably threaded together to form the guide rod/cylinder rod and piston. This split embodiment allows for the hydraulic functions of the carriage to be routed through the piston as a manifold in order to move the associated (required) hydraulic connections away from the outside of the cylinder where they are more susceptible to damage.

The cylinder tube is adapted for reciprocal travel along a guide rod. As hydraulic fluid flows into an annular area defined between the hydraulic cylinder tube and the split guide rod, the hydraulic cylinder tube and rod glands (with jaws attached) will reciprocate back and forth. This is accomplished because one hydraulic fluid chamber (and port therefor) is separated from a second hydraulic fluid chamber (and port therefor) via a seal to separate the first and second annular hydraulic fluid chambers of the cylinder.

The combined hydraulic cylinder and guide rod of the present disclosure is self-contained and when adapted for the modular carriage described above, does not require bolts to be inserted through the jaws as is the case with certain prior art hydraulic cylinder designs. The present cylinders are attached to the moveable jaws with the clamp attachment assembly directly.

Each carriage cylinder may be hydraulically actuated for reciprocal travel on its associated guide rod. Each of the plurality of guide rods has a length and each carriage cylinder has a length and two ends. Each carriage cylinder may surround its associated guide rod. The length of each carriage cylinder is less than the length of its associated guide rod so as to allow reciprocal hydraulic travel of each carriage cylinder along the length of its associated guide rod.

Each carriage cylinder may include a rod gland at each end. Each rod gland is operable to hydraulically seal the carriage cylinder at each end. The rod gland surrounds its associated guide rod. Each rod gland includes a channel for receiving and supporting a movable jaw. As stated previously, in one embodiment there are two moveable jaws, an inner moveable jaw and an outer moveable jaw. In a preferred embodiment each moveable jaw is supported.

A latching mechanism secures the moveable jaws. The movable jaw is secured in the channel by the latching mechanism. In a preferred arrangement the latching mechanism is a lock over (also known as a cam over) clamp. Thus, the movable jaws are secured to the rod glands by tool free engagement.

The rod glands are mounted on the carriage cylinder so as to maintain the first movable jaw and the second movable jaw in a parallel orientation. A movable jaw (inner or outer) is secured to a rod gland at each opposing end of each of at least two guide rods. In one embodiment, two carriage cylinders, one of each of the at least two guide rods are positioned substantially parallel to one another.

It should be understood that carriage cylinders of the carriage of the present disclosure described above may employ a cylinder assembly which may be of a known design. The cylinder may be powered in any known manner, such as pneumatically, or hydraulically.

The cylinder tube is adapted for reciprocal travel along a guide rod. As hydraulic fluid flows into an annular area defined between the hydraulic cylinder tube and the split guide rod, the hydraulic cylinder tube and rod glands (with jaws attached) will reciprocate back and forth. This is accomplished because one hydraulic fluid chamber (and port therefor) is separated from a second hydraulic fluid chamber (and port therefor) via a seal to separate the first and second annular hydraulic fluid chambers of the cylinder.

The combined hydraulic cylinder and guide rod of the present disclosure is self-contained and when adapted for the modular carriage described above, does not require bolts to be inserted through the jaws as is the case with certain prior art hydraulic cylinder designs. The present cylinders are attached to the moveable jaws with the clamp attachment assembly directly.

Some, non-limiting benefits of the present combined hydraulic cylinder/guide rod assembly designs include:
1.) The combination cylinder/guide rod assembles in the carriage without the use of any hand or power tools;
2.) A self-contained design as described herein does not require the jaws (fixed and moveable) to be bolted to the ends to remain assembled.
3.) The design of the present disclosure allows for a small annular area for the cylinder (as compared to other known piston attachment methods which take up considerable space);
4.) A lower cost to manufacture is associated with the present design (lower cost than machining stock material down to add all of the piston features/required elements);
5.) The piston is able to be easily machine as a manifold allowing the hydraulic porting to be done through the hollow cylindrical guide rods;
6.) The hydraulic cylinder/guide rod assembly of the present disclosure includes features that ensure concentricity of the guide rod to provide jaw alignment for proper fusions and to reduce cylinder drag.

A fourth jaw and a skid, when used in conjunction with the three jaw skid, create a four jaw carriage that may be used when fusing on the ground in a traditional manner. The four jaw skid provides a stable base that allows precise alignment of pipe with minimum effort. The three jaw carriage and the outer fixed jaw attach to the skid in a tool less manner through the use of interlocking D-shaped cams. The outer fixed jaw (fourth jaw) is attached to the inner fixed jaw (third jaw) with the usage of two jaw braces.

The skid is comprised of two sections that can be folded flat and pinned rigidly in the flat configuration with the use of four detent pins, or can be folded in half and latched in the closed position using the same D-shaped cams that latch the carriage into the skid. The folding of the skid allows for shipping the carriage in a compact manner. The ability to fold the skid allows the entire package to be packed into four foot shipping pallets.

Benefits of the fourth jaw and skid include the following, without limitation:

1.) A fourth jaw and a skid may be used in conjunction with a three jaw carriage.
2.) The assembly/connection of the jaws to the skid, the jaws to the guide rod(s) and/or jaw(s) to each other is toolless.
3.) The carriage, and particularly the carriage mounted to the skid, provides a stable base for conventional fusion of pipe.
4.) The addition of a fourth jaw eases alignment of one pipe to another through the use of two jaws per side.
5.) The carriage assembly, particularly with the additional fourth jaw, provides increased clamping force for retention of pipe during high force fusion.
6.) D-shaped cams connect the jaws to the skid.
7.) D-shaped cams lock the skid together when folded for shipping.
8.) A Folding skid allows for compact shipment of the carriage assembly package.
9.) A Folding skid can be pinned in a rigid configuration to provide a stable base for fusion.
10.) A Spring plunger is used to ensure the D-shaped cam does not disengage during use Attachment "A" is incorporated fully herein by reference.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

This present disclosure in one embodiment discloses the modular carriage assembly as a three jaw unit and including its modular components as well as general how the carriage assembles. It is the modular design that allows for many different sizes of pipe to be fused with the same fusion system without the use of inserts. In an alternate preferred embodiment, a fourth jaw may be added as described below.

Figure 1:
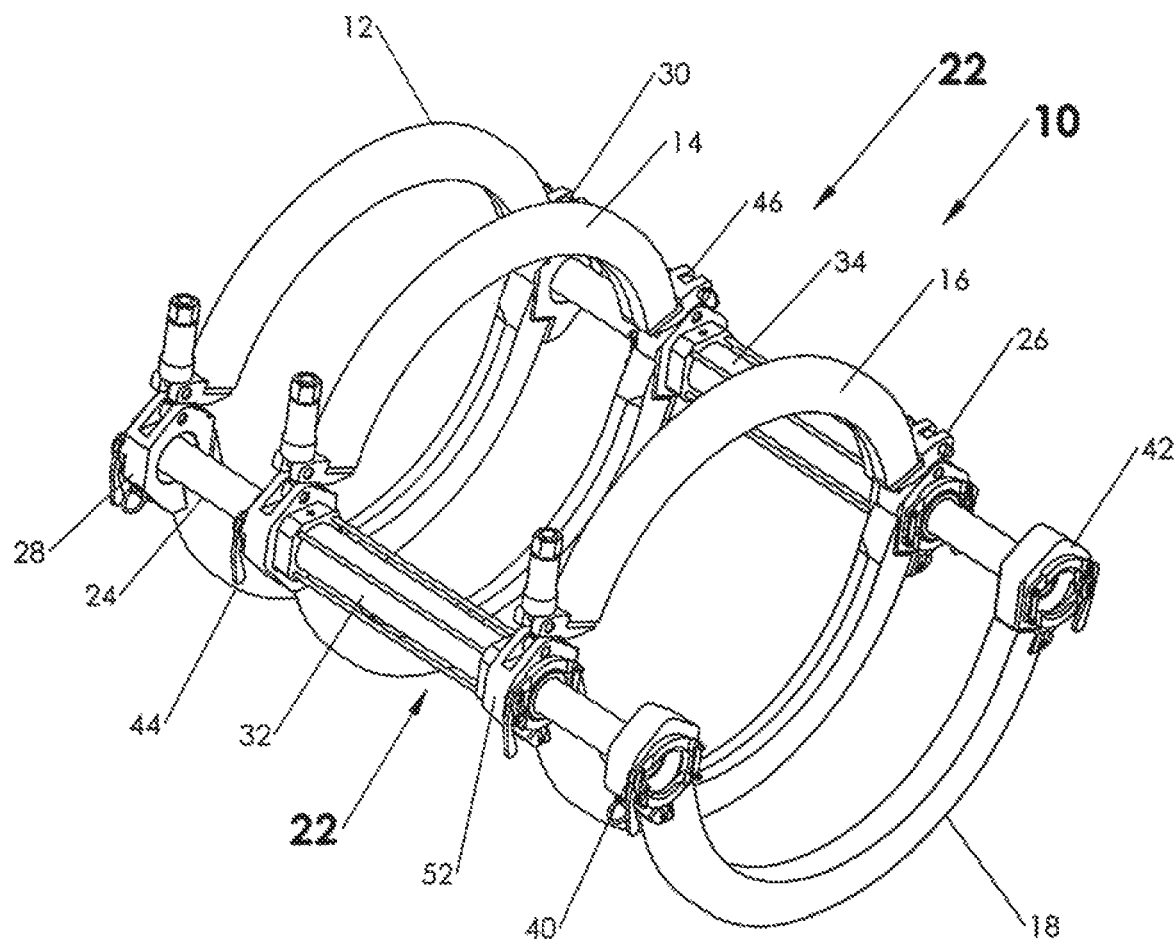
FIG. 1 depicts an isometric view of the carriage of the present disclosure.
Figure 2:
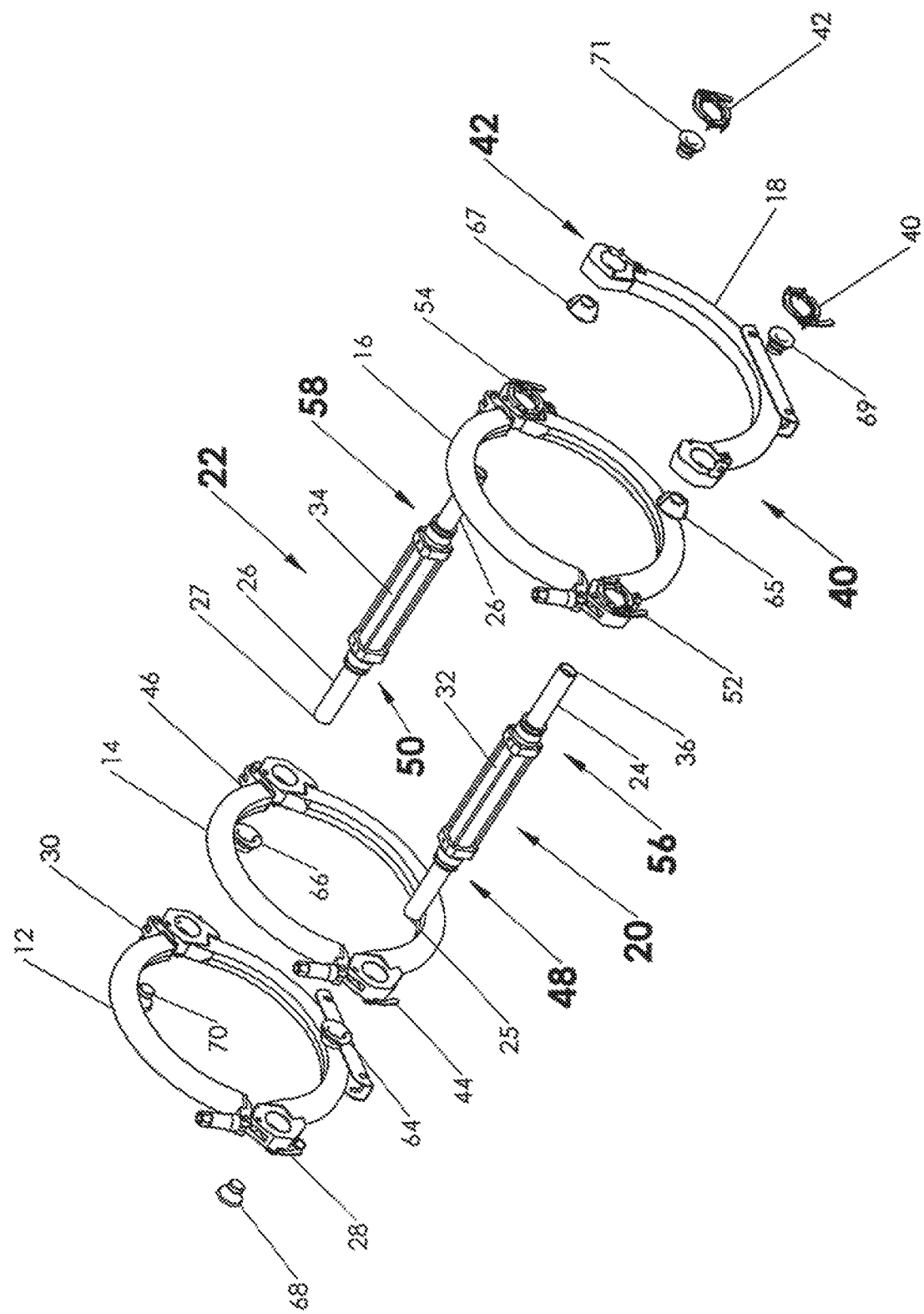
FIG. 2 depicts an exploded view of the carriage of the present disclosure.
Figure 3:
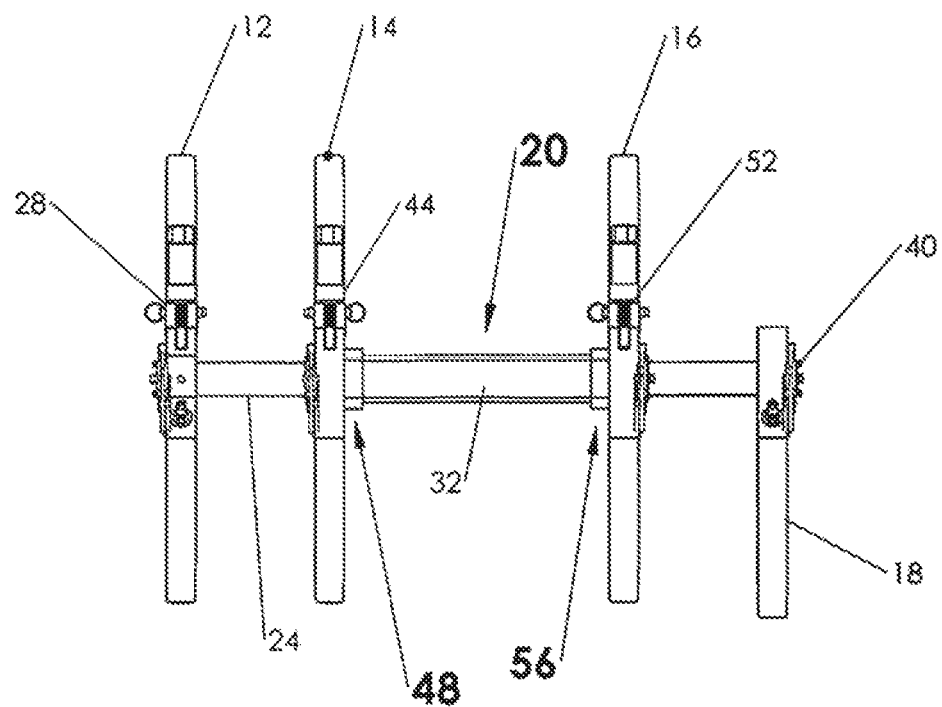
FIG. 3 depicts a side view of the carriage of the present disclosure.
Figure 4:
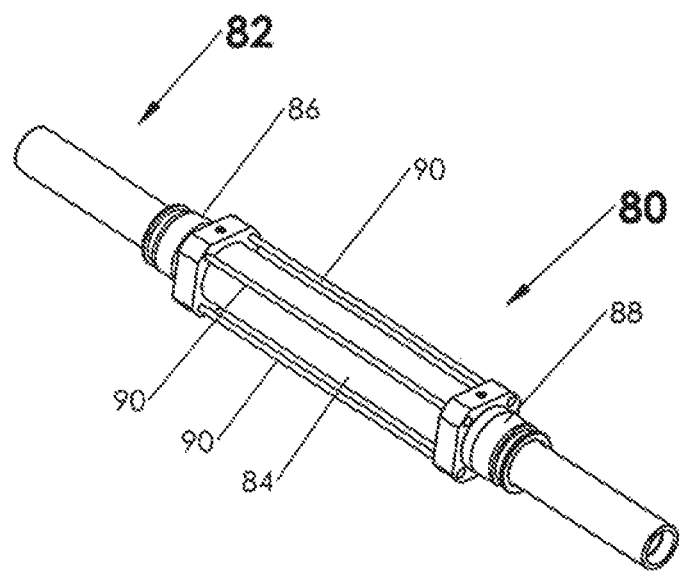
FIG. 4 depicts an isometric view of the combined hydraulic cylinder/guide rod of the present disclosure.

With reference to FIGS. 1-3, the modular carriage assembly of the present disclosure 10 includes in one embodiment, generally, a fixed jaw 12; moveable inner jaw 14, moveable outer jaw 16, and a guide 18 preferably for each size of pipe. In addition, two combined hydraulic carriage cylinder/guide rod assemblies 20 and 22 may be included.

Modular carriage 10 of the present disclosure is adaptable for varying spacing between ends of polymer (polyolefin)

pipe during fusion. The present modular design of carriage 10 allows for many different sizes of pipe to be fused with the same fusion apparatus without the use of inserts.

With specific reference to FIGS. 2 and 3, as set forth above, the modular carriage includes in a basic embodiment fixed jaw 12; an inner moveable jaw 14 and outer movable jaw 16; and two cylinder assemblies 20 and 22. The hydraulic cylinder assemblies 20 and 22 each include a guide rod 24 and 26. The fixed jaw is adapted for tool free engagement of first ends 25 and 27 of guide rods 24 and 26 using clamp/latch assemblies 28 and 30 (discussed further below). A carriage cylinder 32 and 34 is associated with each of the two guide rods 24 and 26, respectively. Carriage cylinders 32 and 34 are mounted for reciprocal travel along guide rod 24 and 26, respectively. Outer movable jaw 14 is adapted for tool free engagement with cylinders 32 and 34 for reciprocal travel therewith. Likewise, inner moveable jaw 16 is adapted for tool free engagement with cylinders 32 and 34 for reciprocal travel therewith. Each moveable jaw 14 and 16 is adapted for engagement with carriage cylinders 32 and 34 for alignment and stability purposes.

Guide rods 24 and 26 each include a longitudinal axis. Each associated carriage cylinder 32 and 34 also includes a longitudinal axis which is concentric with the longitudinal axis of its associated guide rod 24 and 26 (discussed further below).

Guide rod support 18 is adapted for tool free engagement with second ends 36 and 38 of guide rods 24 and 26. Latching assemblies 40 and 42 are each operable to secure guide rod support 18 (and adjacent) to the second ends 36 and 38 of guide rods 24 and 26 by tool free engagement. Outer movable jaw 14 includes two latching assemblies 44 and 46 being operable to secure outer movable jaw 14 onto first ends 48 and 50 of carriage cylinders 32 and 34 respectively by tool free engagement. Inner jaw 16 includes two latching assemblies 52 and 54 operable to secure moveable inner jaw 16 onto second ends 56 and 58 of carriage cylinders 32 and 34 by tool free engagement.

Figure 5:
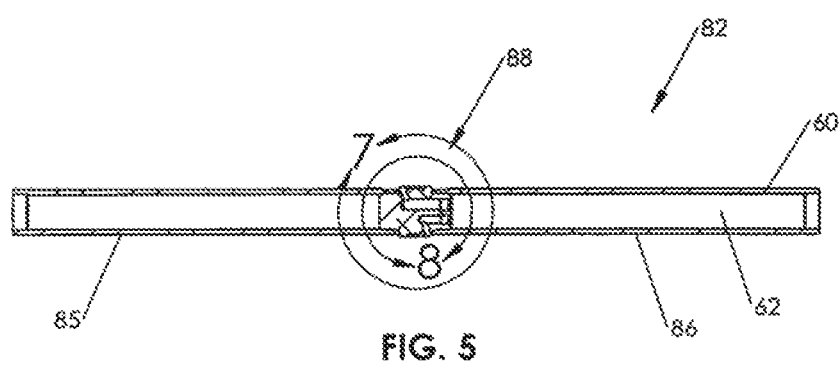
FIG. 5 depicts a longitudinal cut-away side view of the guide rod assembly of the combined hydraulic cylinder/guide rod of the present disclosure.
Figure 6:
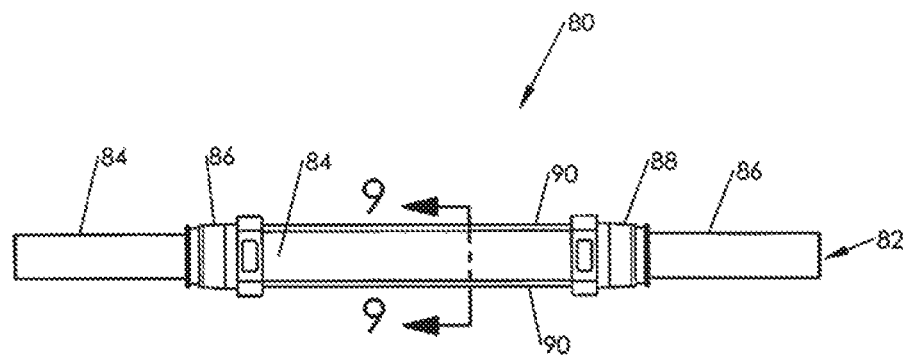
FIG. 6 depicts a side view of the combined hydraulic cylinder/guide rod of the present disclosure.
Figure 7:
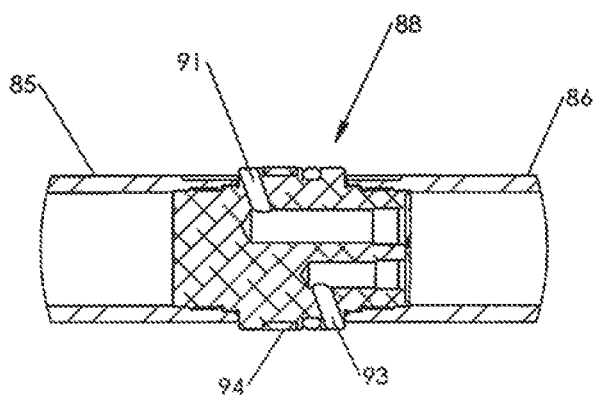
FIG. 7 is an enlarged section detailed view 7 of FIG. 5.
Figure 8:
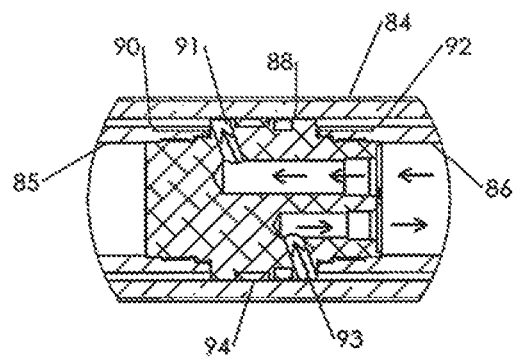
FIG. 8 is an enlarged partial view of detail 8 of FIG. 5 depicting the combined hydraulic cylinder/guide rod of the present disclosure and specifically the hydraulic flow path through the piston.
Figure 9:
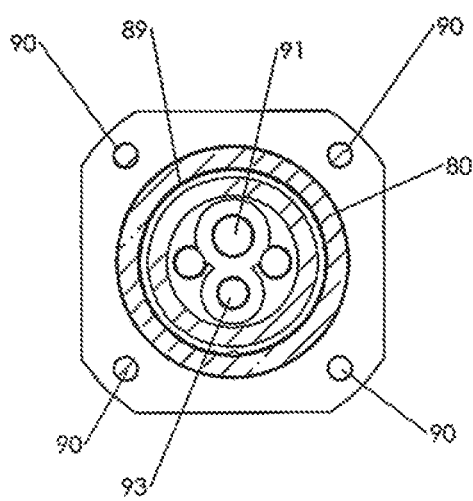
FIG. 9 is a cross-sectional view of the combined hydraulic cylinder/guide rod of the present disclosure taken along line 9-9 of FIG. 6.

Guide rods 24 and 26 are each substantially cylindrical with an external surface and an internal surface. (Such as external surface 60 and internal surface 62 of guide rod 24 depicted in FIG. 5). A guide rod sleeve 64 and 66 is positioned at least partially over the external surface of each guide rod, 24 and 26 respectively, adjacent first ends 25 and 27. The fixed jaw is secured to the plurality of guide rods adjacent their first end. Guide rod caps 68 and 70 are in contact with (threaded into) the internal surface 62 at first ends 25 and 27. Fixed jaw 12 is positioned between guide rod sleeve 64 and 66 and guide rod caps 68 and 70 and secured by the latching mechanisms 28 and 30.

Figure 10:
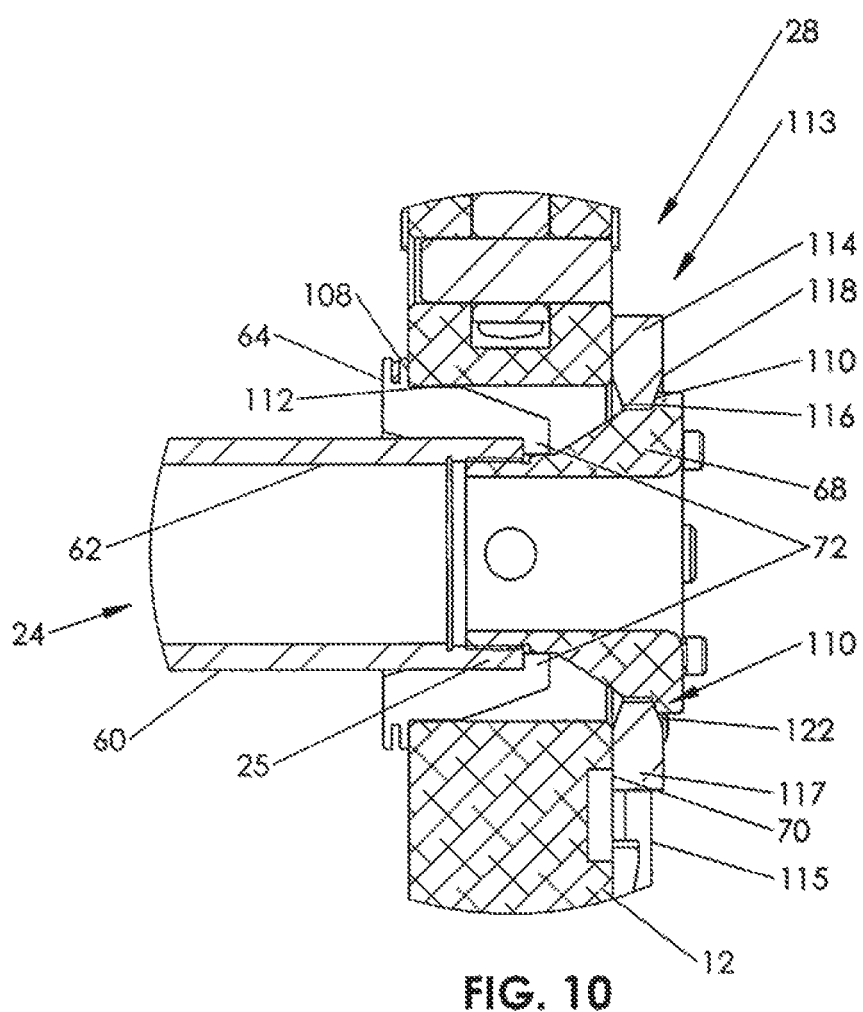
FIG. 10 is a cut-away side view of the latch assembly depicting attachment of a fixed jaw to an end of a guide rod.

Each guide rod sleeve such as sleeve 64 of FIG. 10, may include a shoulder 72 for retaining the guide rod sleeve 64 adjacent the first end 25 of its respective guide rod 24. Carriage cylinders 32 and 34 may be hydraulically actuated for reciprocal travel on its associated guide rod 24 and 26.

Figure 11:
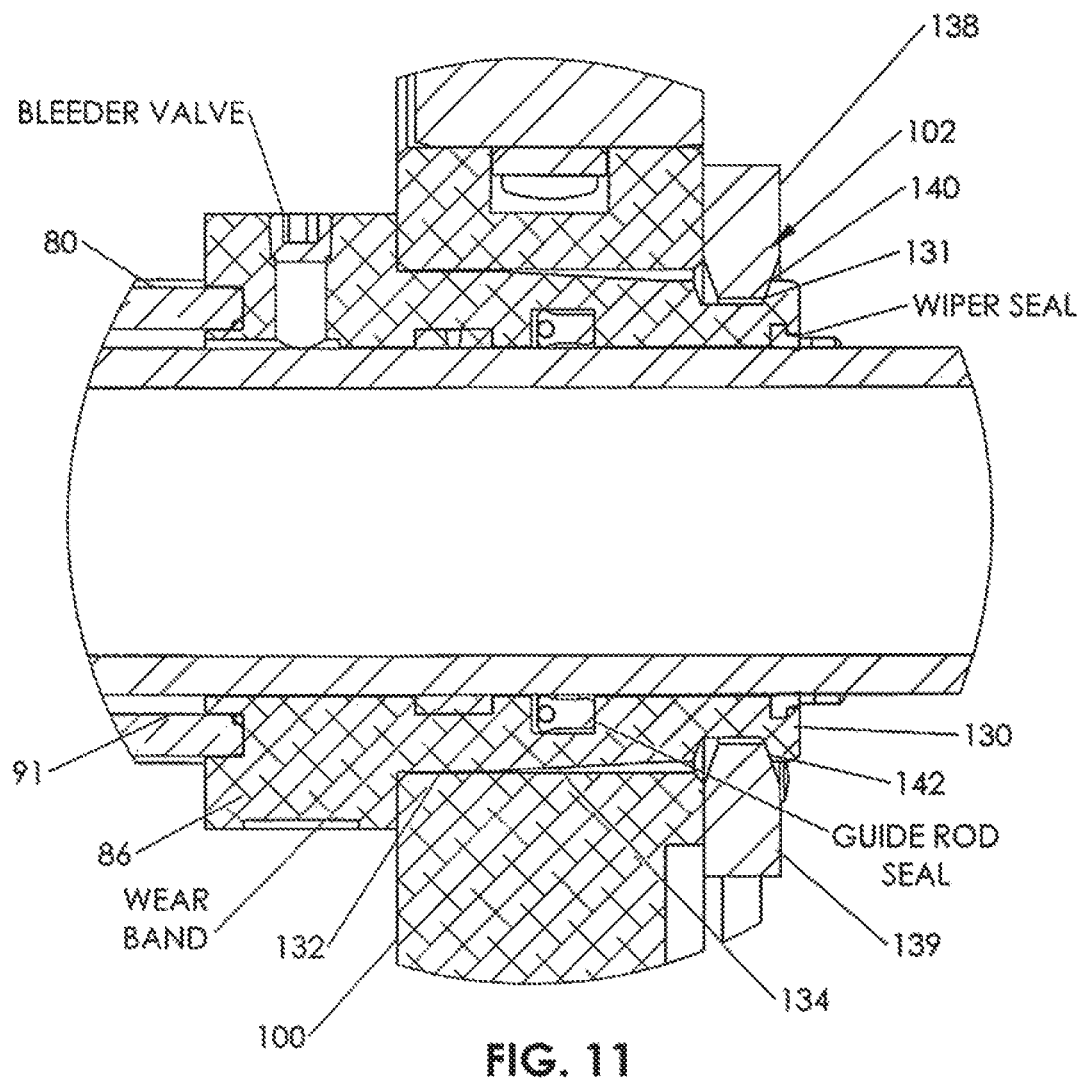
FIG. 11 is a cut-away side view of the latch assembly depicting attachment of a moveable jaw to a rod gland sealing an end of the hydraulic cylinder and surrounding the guide rod.

Latching mechanisms 44 and 46 secure moveable jaw 14. Movable jaw 14 is secured in a channel by the latching mechanism (FIG. 11). In a preferred embodiment the latching mechanism is a lock over (also known as a cam over) clamp 76. Thus, movable jaw 14 is secured to the first ends 48 and 50 of cylinders 32 and 34 by tool free engagement. The disclosure of U.S. provisional patent application Ser. No. 62/560,666, filed on Sep. 19, 2017 and U.S. provisional patent application Ser. No. 62/561,008, filed on Sep. 20, 2017.

Latching mechanisms 52 and 54 secure inner moveable jaw 16 to the ends 56 and 58 of cylinders 32 and 34. Moveable jaw 16 is secured in a channel in the same way as jaw 14 of FIG. 11 and described above. Moveable jaw 16 is secured to second ends 56 and 58 of cylinders 32 by clamps 52 and 54 respectively.

With reference to FIG. 10, an embodiment latching assembly 28 for securing fixed clamp 12 to the end 25 of guide rod 24 by tool free engagement according to the present disclosure shall next be described. Sleeve 72 is secured over end 25 of guide rod 24. Sleeve 72 includes a shoulder 75 retaining sleeve 72 from being forced over end 25. Sleeve 72 includes a second wall 110. Fixed jaw 12 is then placed over sleeve 72. Cap 68 is then threaded inside surface 62 of end 25. Cap 68 includes a first wall 110. Sleeve 72 and cap 68 together define a channel 112 for receiving fixed jaw 12. Fixed jaw 12 is in contact with second wall 108 and adapted to transfer force to second wall 108. First wall 110 includes a tapered surface 116 which mates the taper of tapered surface 118 of a clamping segments 114 and 117 of clamp 113.

Latching mechanism 102 includes clamp 136 adapted to exert a clamping force upon moveable jaw 100. Clamp 113 includes two clamp segments 138 and 139 each having a tapered interface 140 and 142 which is adapted to wedge against a tapered interface 131 of first wall 130. Tapered interfaces 140 and 142 further are adapted for receiving a clamping force exerted by clamp 136 and for transferring that force against tapered interface 131 of the first wall 130.

Clamp segments 138 and 139 are positioned between first wall 130 and moveable jaw 100 and are adapted for transferring force from clamp 136 to moveable jaw 100. Application of clamping force by clamp 136 on clamp segments 138 and 139 forces their respective tapered interface 140 and 142 against the mating tapered interface 131 of first wall 130. This results in a force which translates from clamp segments 138 and 139, through moveable jaw 100, and against second wall 132 thereby securing moveable jaw 100, and clamp 136 within channel 134.

An identical latching mechanism 40 (FIG. 1) secures guide 18 onto second end 36 in the same manner as fixed jaw 12. Second guide rod caps 69 and 71, second guide rod sleeves 65 and 67, and cam over clamps 53 and 55 are depicted in FIG. 2.

An identical latching mechanism 40 (FIG. 1) secures a guide 18 onto second end 36 in the same manner as fixed jaw 12. Second guide rod caps 69 and 71, second guide rod sleeves 65 and 67, and cam over clamps 53 and 55 are depicted in FIG. 2.

Next with reference to FIG. 11 an example latching mechanism 102 for securing an example moveable jaw 100 of carriage 10 is depicted in one embodiment employing the combination hydraulic cylinder tube/guide rod 80 of the present disclosure and described below in relation to FIGS. 5-9. As shown, cylinder tube 80 includes rod gland 86 onto which example moveable jaw 100 is secured. Rod gland 86 includes a first wall 130 and second wall 132 defining a channel 134 therebetween for receiving at least moveable jaw 100 and clamp 136 of latching mechanism 102.

It should be understood that carriage cylinders 20 and 22 of the carriage of the present disclosure described above may employ a cylinder assembly which may be of a known design. The cylinder may be powered in any known manner, such as pneumatically, or hydraulically.

One particularly suited cylinder design in a preferred embodiment depicted in FIGS. 4-9, however, includes a novel combination hydraulic cylinder/guide rod 80 which shall be next described. Cylinder 80 includes in one embodiment a guide rod 82; cylinder tube 84; a rod gland 86 and 88 on each end of cylinder tube 84; and a plurality of tie rods collectively 90, extending between the rod glands 86 and 88. It should be understood that in the preferred embodiment of FIGS. 1-3, combination hydraulic cylinder/guide rod 80 is employed as cylinders 20 and 22.

The guide rod 82 of the present disclosure in one embodiment includes three separate (split) elements (FIG. 5) that are preferably threaded together to form guide rod 82. These elements include a first guide rod segment 84, second guide rod segment 87 and a piston 88. This split embodiment allows for the hydraulic functions of carriage 80 to be routed through piston 88 as a manifold in order to move the associated (required) hydraulic connections away from the outside of the cylinder where they are more susceptible to damage. Piston 88 includes an internally ported body with machined in sealing features for proper hydraulic functions.

Hydraulic cylinder tube 84 is preferably a composite tube for encasing the hydraulic cylinder piston/guide rod. Rod gland 86 and 88 on each end of cylinder tube 84 seals on the cylinder rod and cylinder tube and seals the cylinder tube. The rod gland also pilots on the cylinder bore to properly align the carriage jaws. The tie rods connect the two rod glands at the ends of the cylinder tube.

Cylinder tube 84 is adapted for reciprocal travel along guide rod 82. As hydraulic fluid flows into an annular area defined between hydraulic cylinder tube 84 and split guide rod 82, hydraulic cylinder tube 84 and rod glands 86, 88 (with jaws attached) will reciprocate back and forth. This is accomplished because first hydraulic fluid chamber 89 (and port 91 therefor) is separated from a second hydraulic fluid chamber 92 (and port 93 therefor) via a seal 94 to separate first 89 and second 90 annular hydraulic fluid chambers of the cylinder 80.

The combined hydraulic cylinder and guide rod 80 of the present disclosure is self-contained and when adapted for the modular carriage 10 described above with respect to FIGS. 1-3, does not require bolts to be inserted through jaws 12, 14, and 16 as is the case with certain prior art hydraulic cylinder designs. The moveable jaws 14 and 16 are attached to rod glands 86 and 88, respectively, with latch mechanisms 44 and 52.

Figure 12:
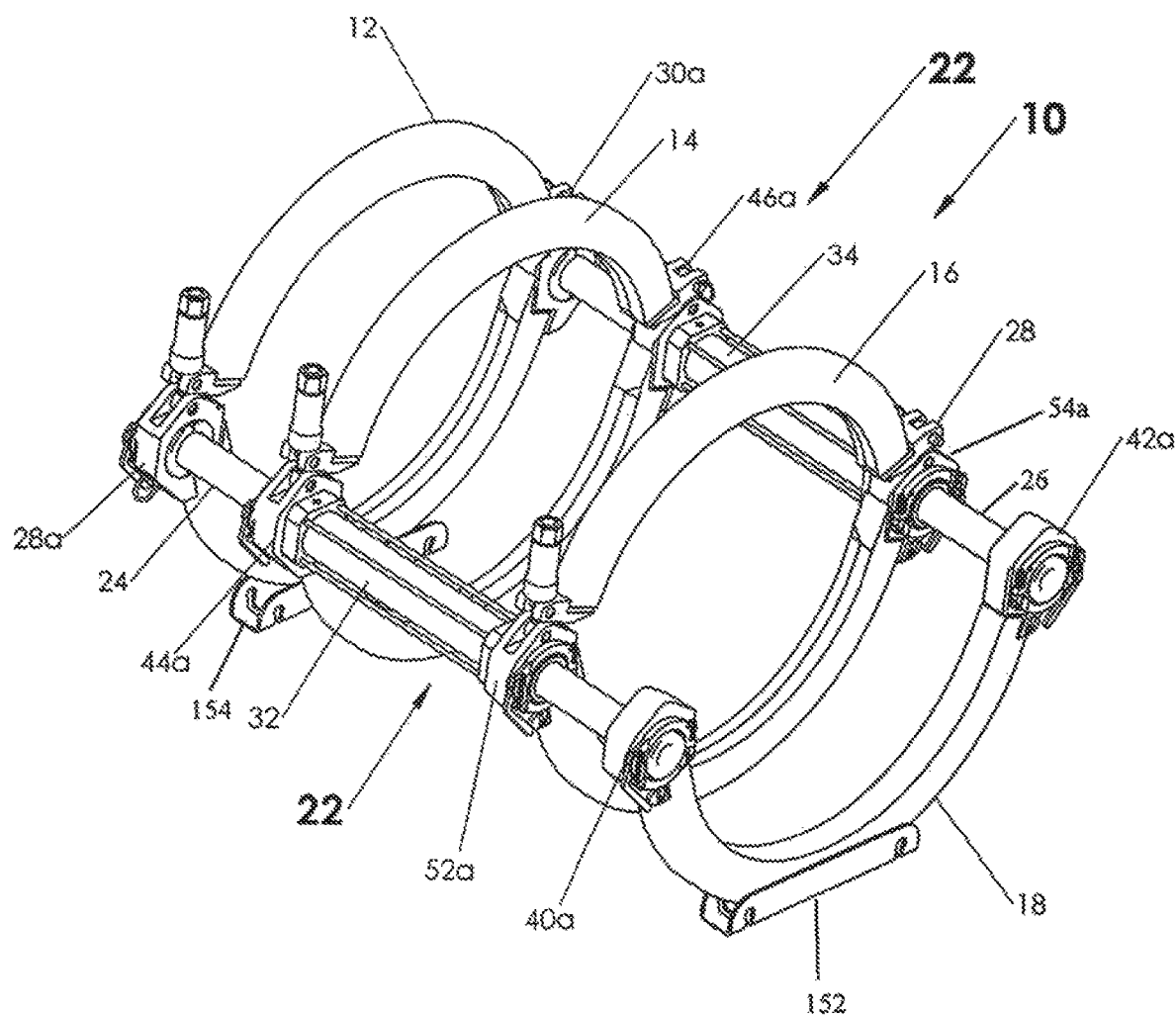
FIG. 12 alternative embodiment isometric view of the carriage of FIG. 1 depicting an alternate clamp design.
Figure 12A:
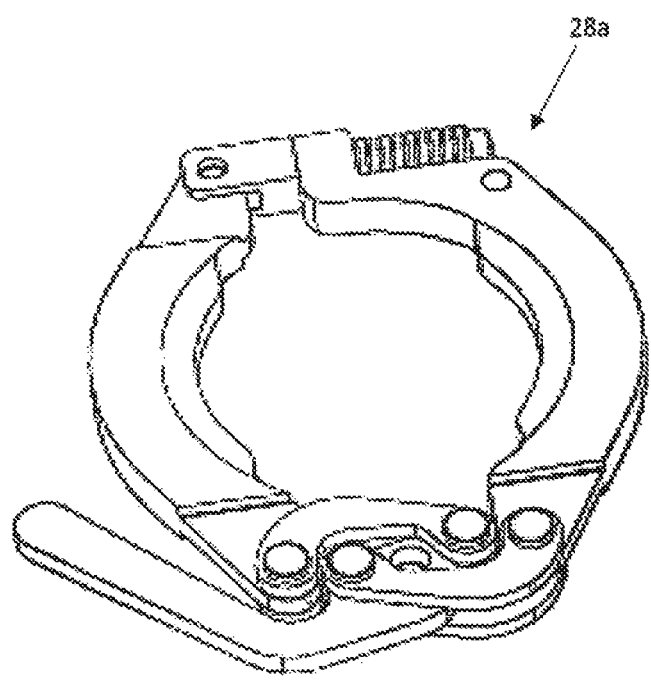
FIG. 12A depicts the alternate claim design of FIG. 12.
Figure 13:
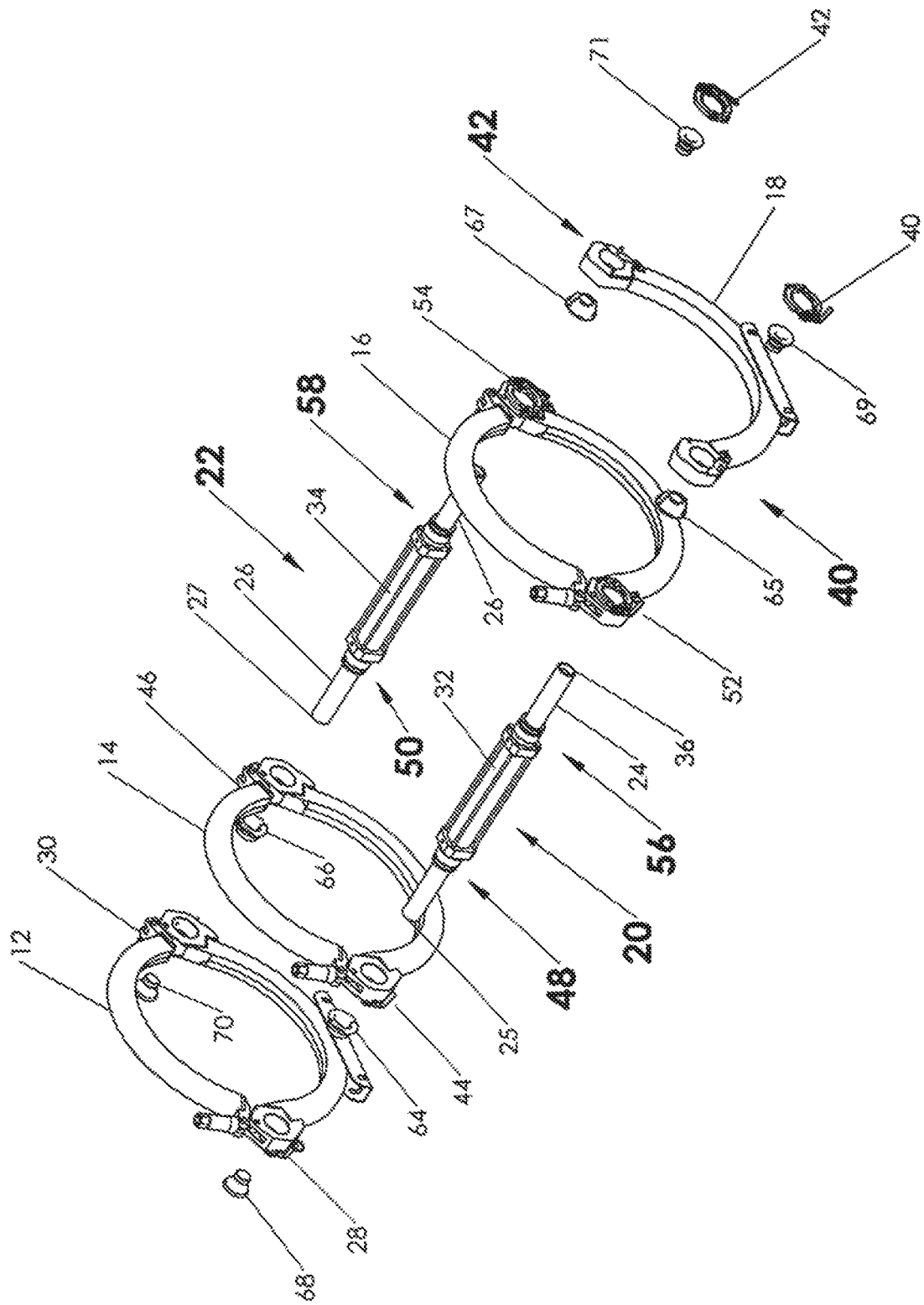
FIG. 13 depicts an exploded view of the alternate embodiment carriage of FIG. 12.

FIG. 12 is an isometric view of the carriage assembly 10 of the present disclosure as depicted in FIG. 1 with the exception that clamps 28, 30, 40, 42, 44, 46, 52, and 54 of FIG. 1 have been replaced with a slightly modified embodiment clamps 28a, 30a, 40a, 42a, 44a, 46a, 52a, and 54a. As depicted in FIG. 12A, new clamps 28a, (and 30a, 40a, 42a, 44a, 46a, 52a, and 54a) has been modified so as to provide a spring on the pivot end and a modified latch mechanism which does not protrude from the exterior of the clamp. FIG. 13 is the exploded view of FIG. 2 again modified to include modified clamps 28a, 30a, 40a, 42a, 44a, 46a, 52a, and 54a.

Figure 14:
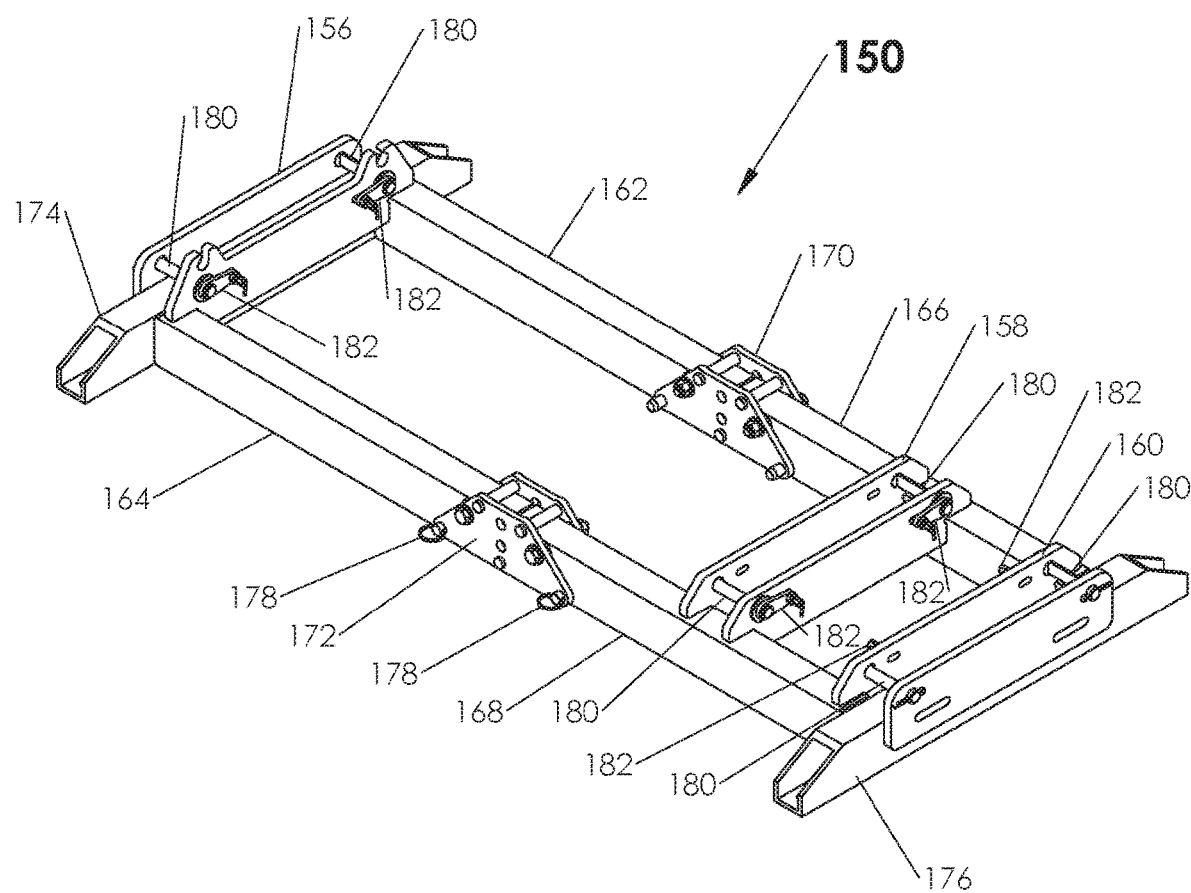
FIG. 14 is an isometric view of the skid used to support the carriage of the present disclosure.

FIG. 14 depicts a skid 150 configured to receive carriage assembly 10 of the present disclosure. Skid 150 is comprised of a substantially rectangular frame in a preferred embodiment. The frame includes stabilizer feet 174 and 176 separated by a plurality of longitudinal segments 162, 164, 166, and 168. Each of longitudinal segments 162, 164, 166, and 168 are secured to a respective foot 174 or 176 on one end and a joint, either joint 170 as in the case of longitudinal segments 162 and 166 or joint 172 as in the case of longitudinal segments 164 and 168. The skid 150 includes a plurality of cradles 156, 158, and 160 such that, in a preferred arrangement, cradle 156 is positioned over stabilizer foot 174 while cradle 160 is positioned over an adjacent stabilizer foot 176. Cradle 158 spans longitudinal segment 166 and 168 and is spaced a distance from cradle 160. Cradles 156, 158, and 160 are designed to receive skid interfaces 152 and 154 of FIGS. 12 and 13.

Skid 150 is designed to pivot flat and pin rigidly with use of a plurality of detent pins, collectively 178. Alternatively, for the purpose of packaging and shipping in a compact arrangement, pins 178 can be removed from joints 170, 172 such that skid 150 can be folded over itself as depicted in FIGS. 15 and 16.

Cradles 156, 158, and 160 include a plurality of D-shaped cams, collectively 180, which are articulated through the use of respective rotation levers, collectively 182 in order to secure carriage 10 of the present disclosure to provide a stable platform.

Figure 15:
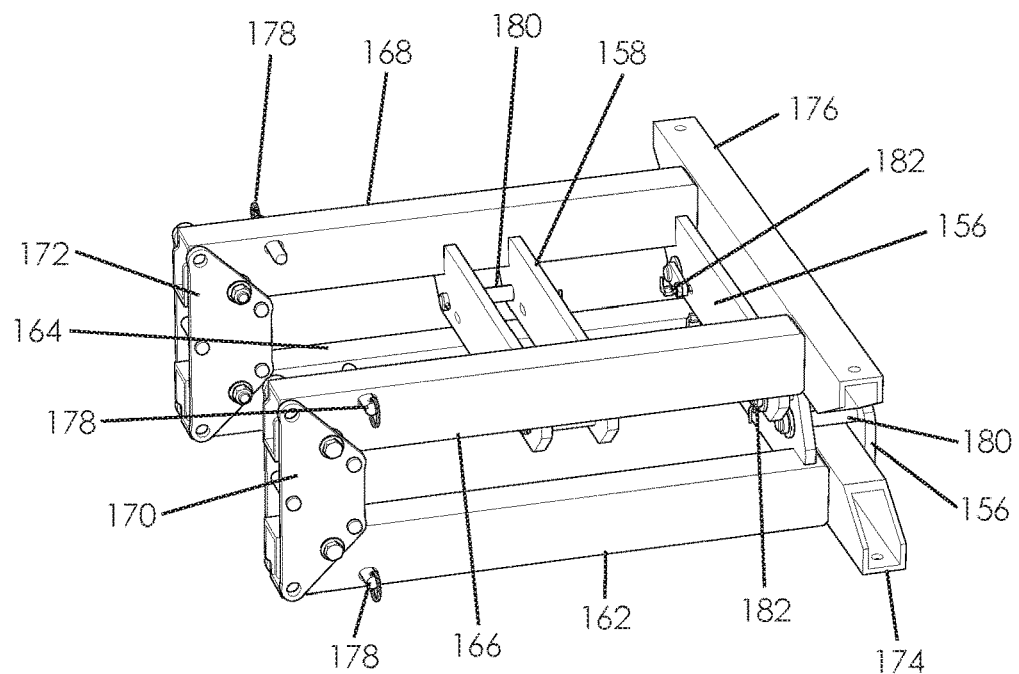
FIG. 15 is an isometric view of the skid of FIG. 13 in a folded configuration for packaging and shipment.

FIG. 15 depicts skid 150 in a folded, shipping configuration. As can be seen in FIG. 15, longitudinal segments 166 and 168 are pivoted over longitudinal segments 162 and 164 respectively at joints 170 and 172. As can be seen, in this configuration, pins 178 are removed from joints 170 and 172 and may be inserted into longitudinal segments 162, 164, 166 and 168 for safekeeping during transport. Longitudinal segments 166 and 168 are by design in a preferred arrangement slightly longer than longitudinal segments 162 and 164 such that when longitudinal segments 166 and 168 are folded over longitudinal segments 162 and 164 at joints 170 and 172, cradle 160 interlocks (nests) with cradle 156 and is secured therein. With reference back to FIG. 14, cradle 156 includes receiver segments 157, collectively, which receive pins 180 of cradle 160. Once D-shaped cams 180 are received in segments 157, levers 182 are rotated 180 degrees so as to secure and nest cradle 160 into cradle 156.

Figure 16:
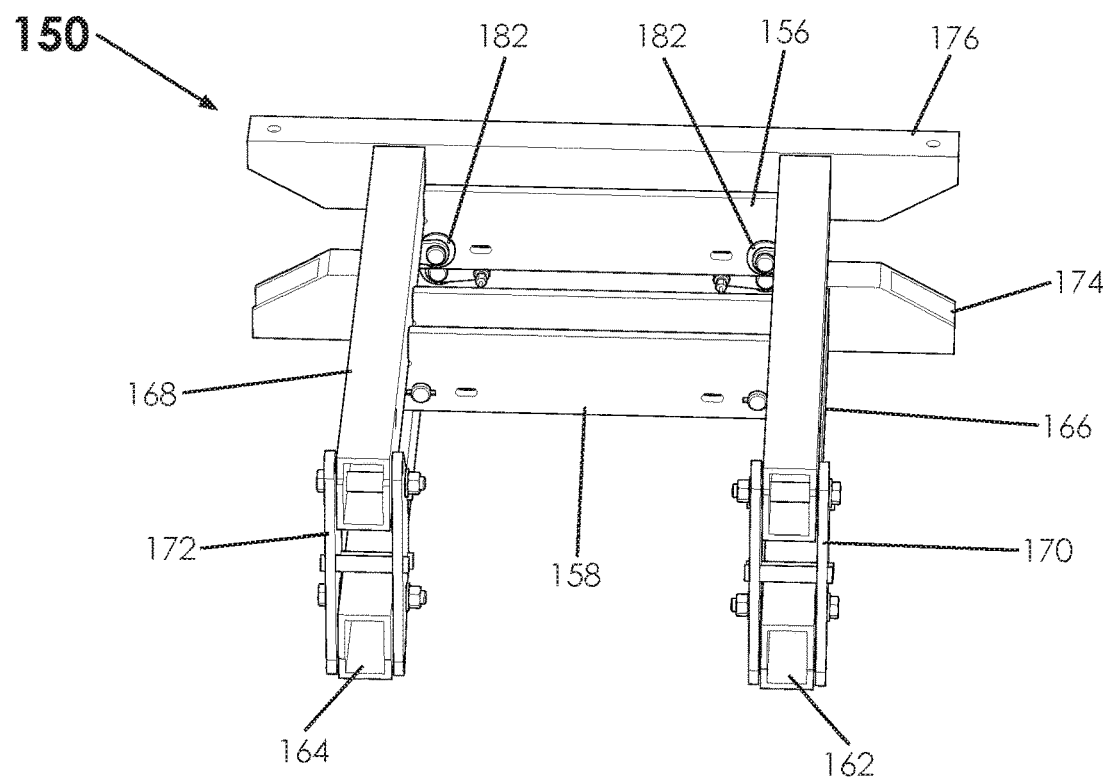
FIG. 16 depicts the folded skid of FIG. 14 oriented 90 degrees depicting the latches used to unfold the skid.
Figure 17:
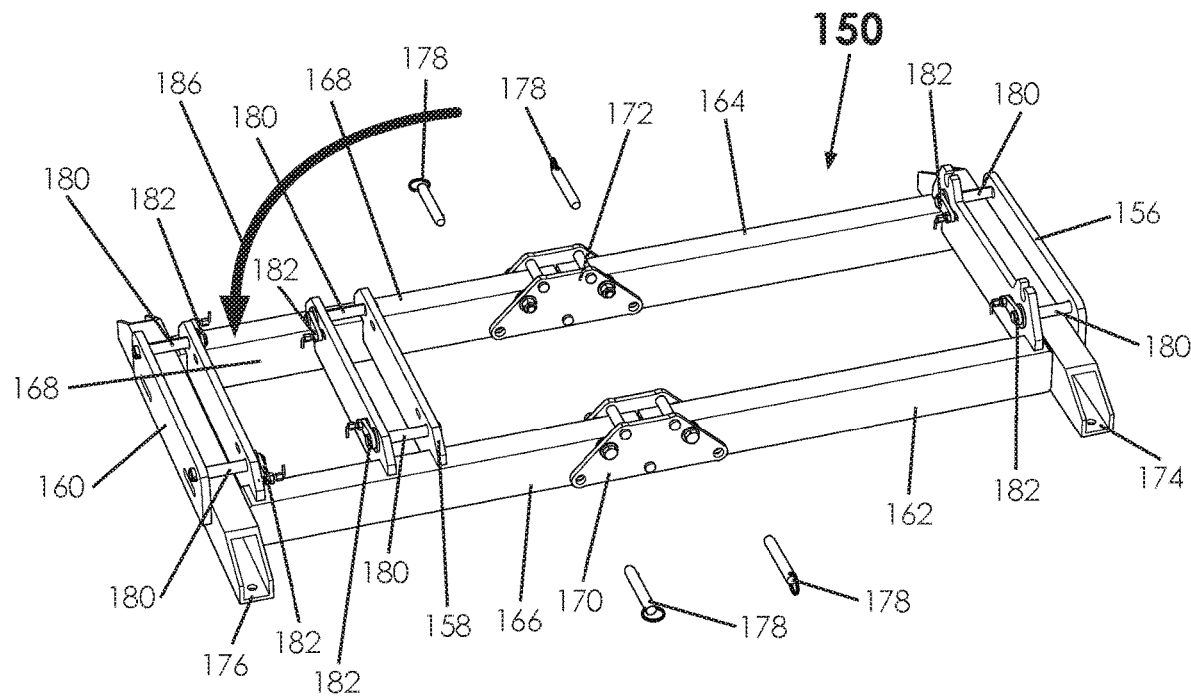
FIG. 17 depicts the skid of FIG. 1 unfolded in a flat configuration.

FIG. 16 is a view of the folded cradle 150 of FIG. 15 rotated approximately 90 degrees in order to illustrate the unfolding procedure. As depicted, in order to unfold skid 150 in a preferred arrangement, rotation levers 182 are rotated 180 degrees so as to release D-shaped cams from nesting segments 157 (FIG. 14). Once D-shaped cams 180 are released, or unlocked, stabilizer foot 174, as well as longitudinal segments 166 and 167 may be rotated flat at joints 170 and 172 as depicted in FIG. 17 and arrow 186. Once rotated flat, detent pins 178 are once again inserted into joints 170, 172 and through respective longitudinal segments 162, 164, 166, or 168 so as to secure skid 150 in a flat or open position.

Figure 18:
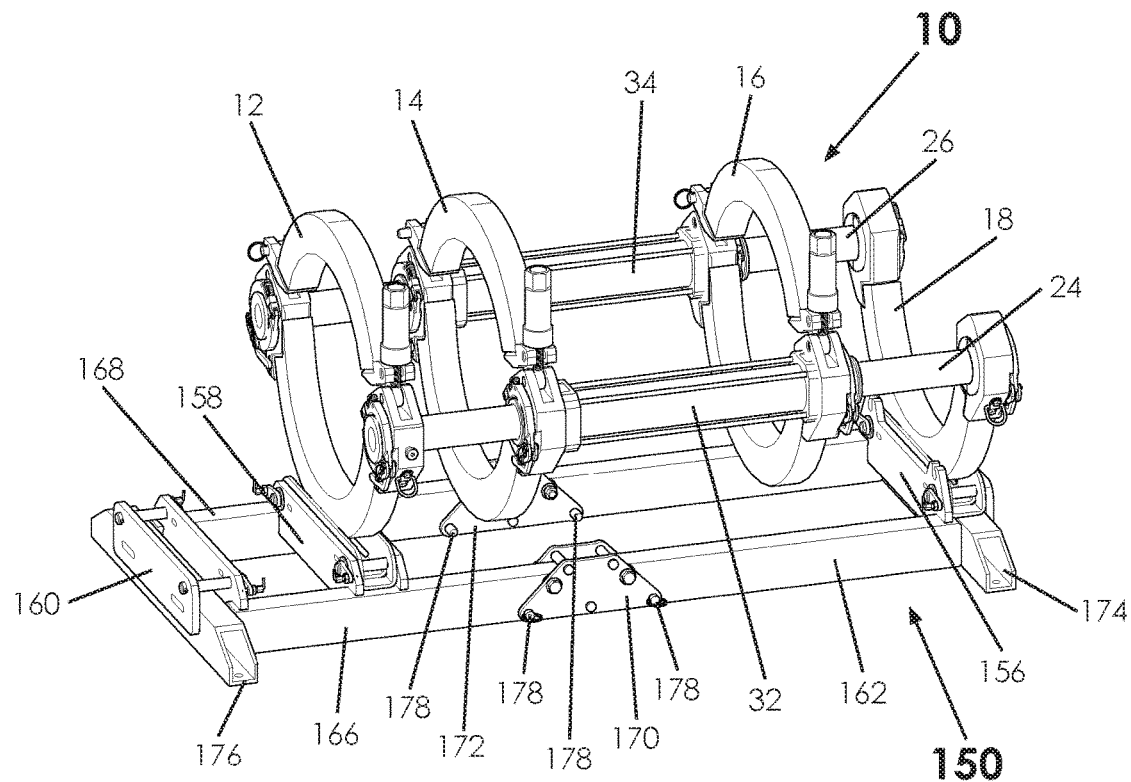
FIG. 18 is an isometric view of the carriage assembly of the present disclosure inserted into the unfolded skid of FIG. 16.

With reference to FIG. 18, once skid 150 is positioned open or flat, carriage assembly 10 of the present disclosure may be secured to skid 150 by inserting skid interfaces 152 and 154 (FIG. 12) into cradles 156, 158, respectively. Rotation levers 182 are then rotated so as to rotate D-shaped cams 180 to secure skid interface 152 with cradle 158 and skid interface 154 in cradle 156.

Figure 19:
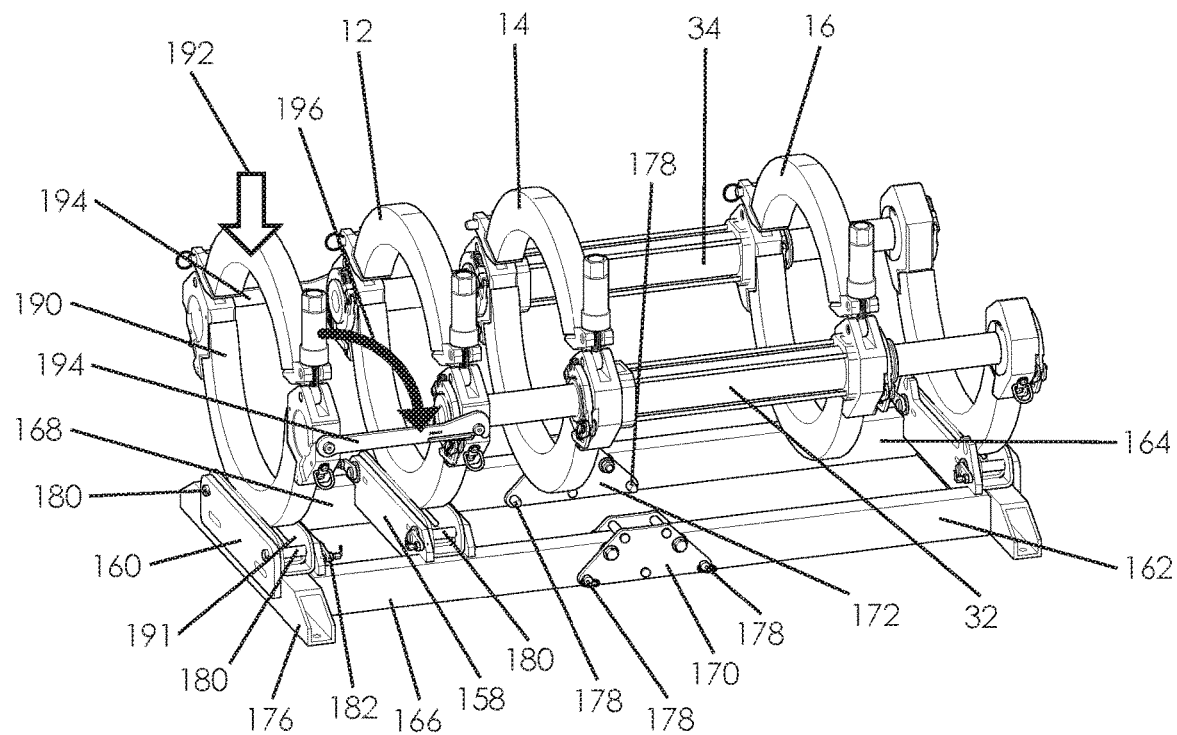
FIG. 19 is an isometric view of the carriage assembly inserted into a skid with a fourth jaw added.
Figure 20:
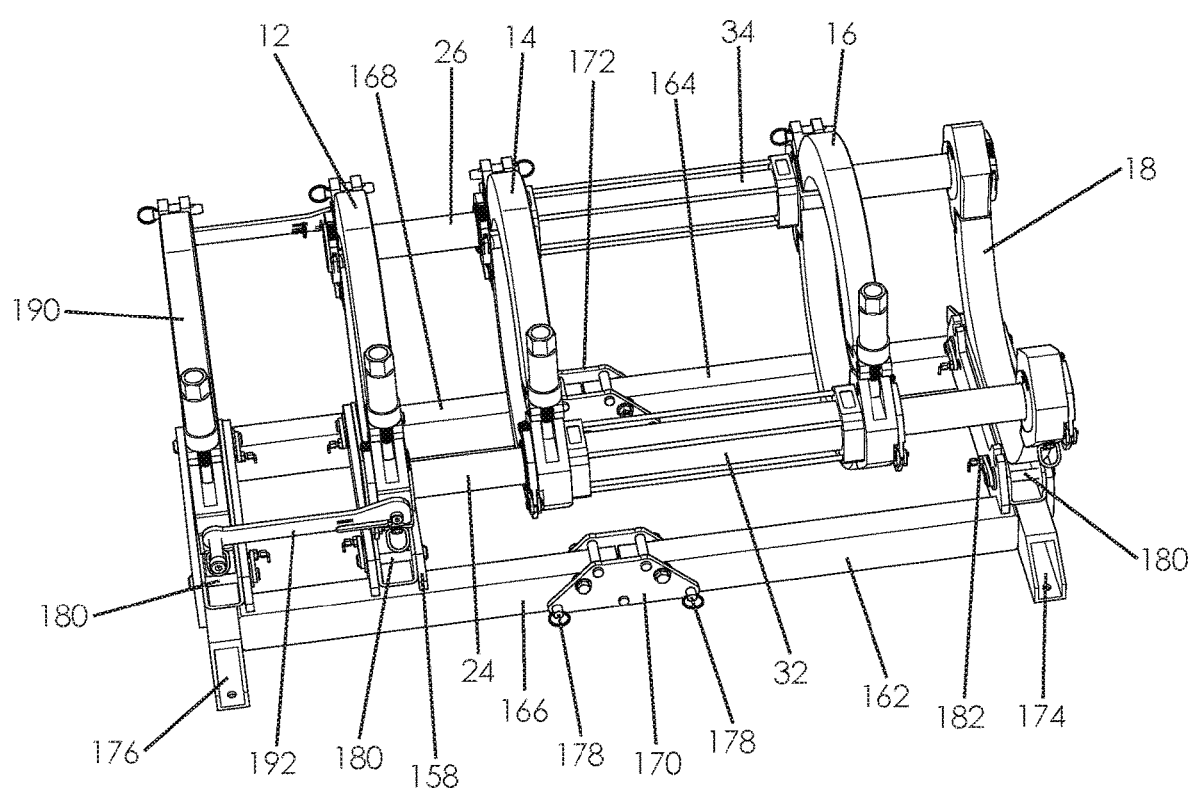
FIG. 20 is an isometric top view of the skid of the carriage assembly of the present disclosure inserted into a skid with a fourth jaw depicting the latching points.

With reference to FIGS. 19 and 20, in an alternate preferred embodiment, a fourth jaw 190 having a skid interface 191 may be added for stability. Fourth jaw 190 may be inserted such that skid interface 191 is inserted into cradle 160 and secured therein via D-shaped cams 180 via rotation levers 182. The fourth jaw 190 may be used in conjunction with the carriage assembly 10 of the present disclosure to create a four jaw carriage which may be used when fusing pipe on the ground in a traditional manner. The fourth jaw 190 provides additional stability such that a four jaw skid allows a stable base that may allow more precise alignment of pipe than a three jaw configuration. As depicted, a plurality of jaw braces 194 may bridge between fourth jaw 190 and jaw 12 and are secured as depicted in arrow 196.

Figure 21:
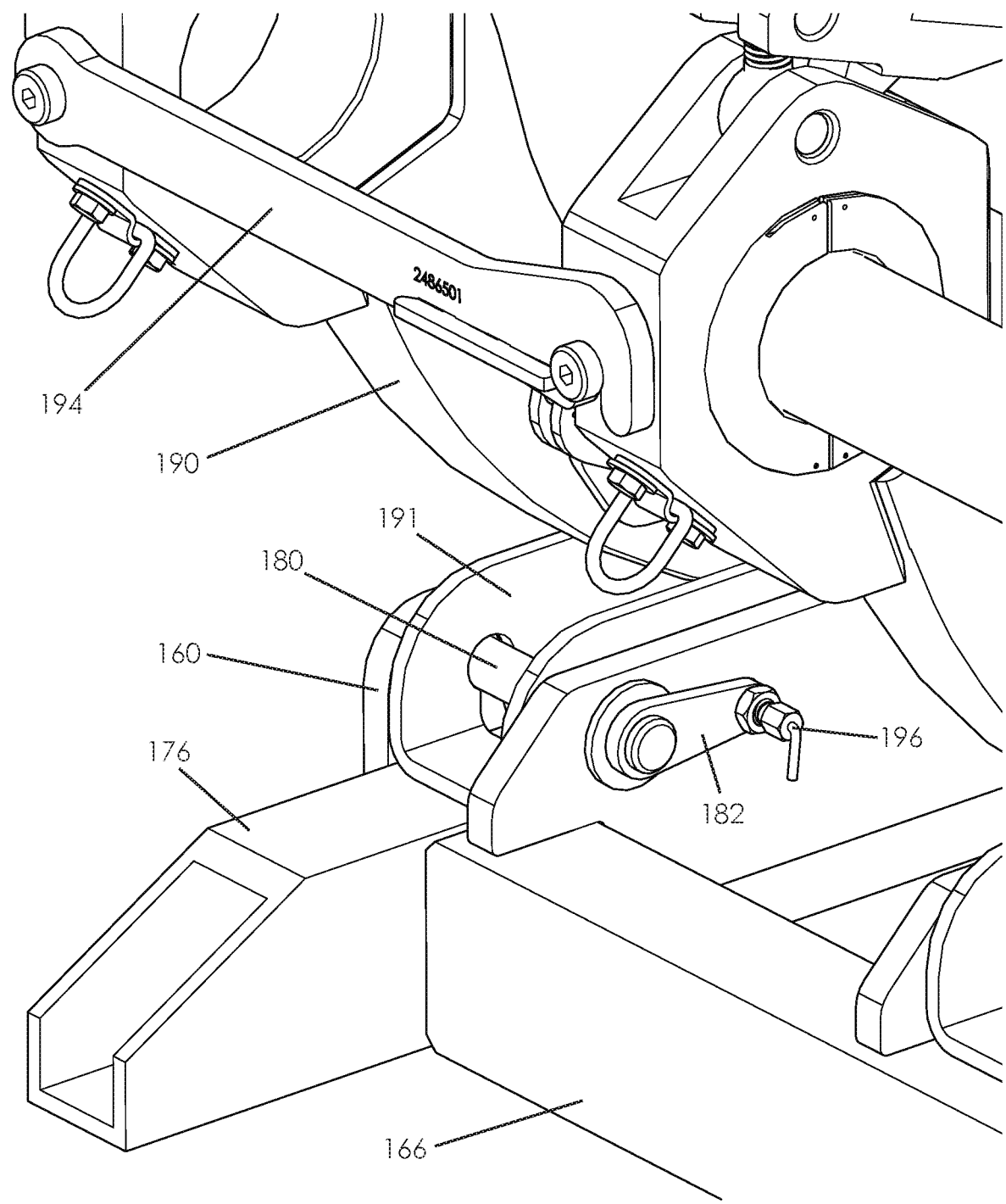
FIG. 21 is a close up view of the latching mechanism of FIG. 20 depicting the D-shaped cam in an unlocked position for loading the fourth jaw into the skid.

FIG. 21 is an enlarged view of fourth jaw 190 including its associated skid interface 191 positioned in cradle 160. FIG. 21 depicts D-shaped cam positioned in an unlocked state for insertion and removal of skid interface 191 into cradle 160. Rotation lever 182 is depicted to include a locking mechanism 196 to prevent unintentional unlocking.

Figure 22:
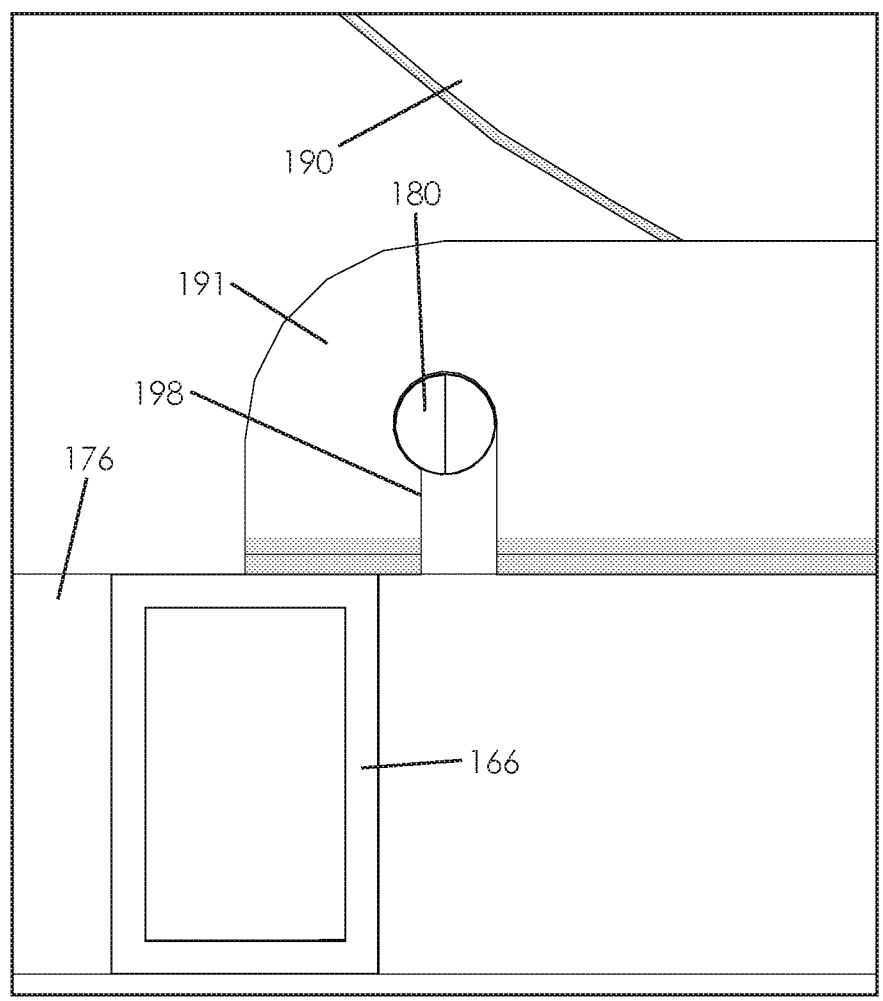
FIG. 22 is a close up view of the D-shaped cam of FIG. 21 in an unlocked position.

FIG. 22 depicts the opposite end of the assembly of FIG. 21 in a close up wherein a partial cutaway showing a cam slot 198 created in skid interface 191 into which D-shaped cam 180 is positioned. As shown, D-shaped cam 180 is in the unlocked position such that skid interface 191 may be lifted such that D-shaped cam is protracted out of cam slot 198.

Figure 23:
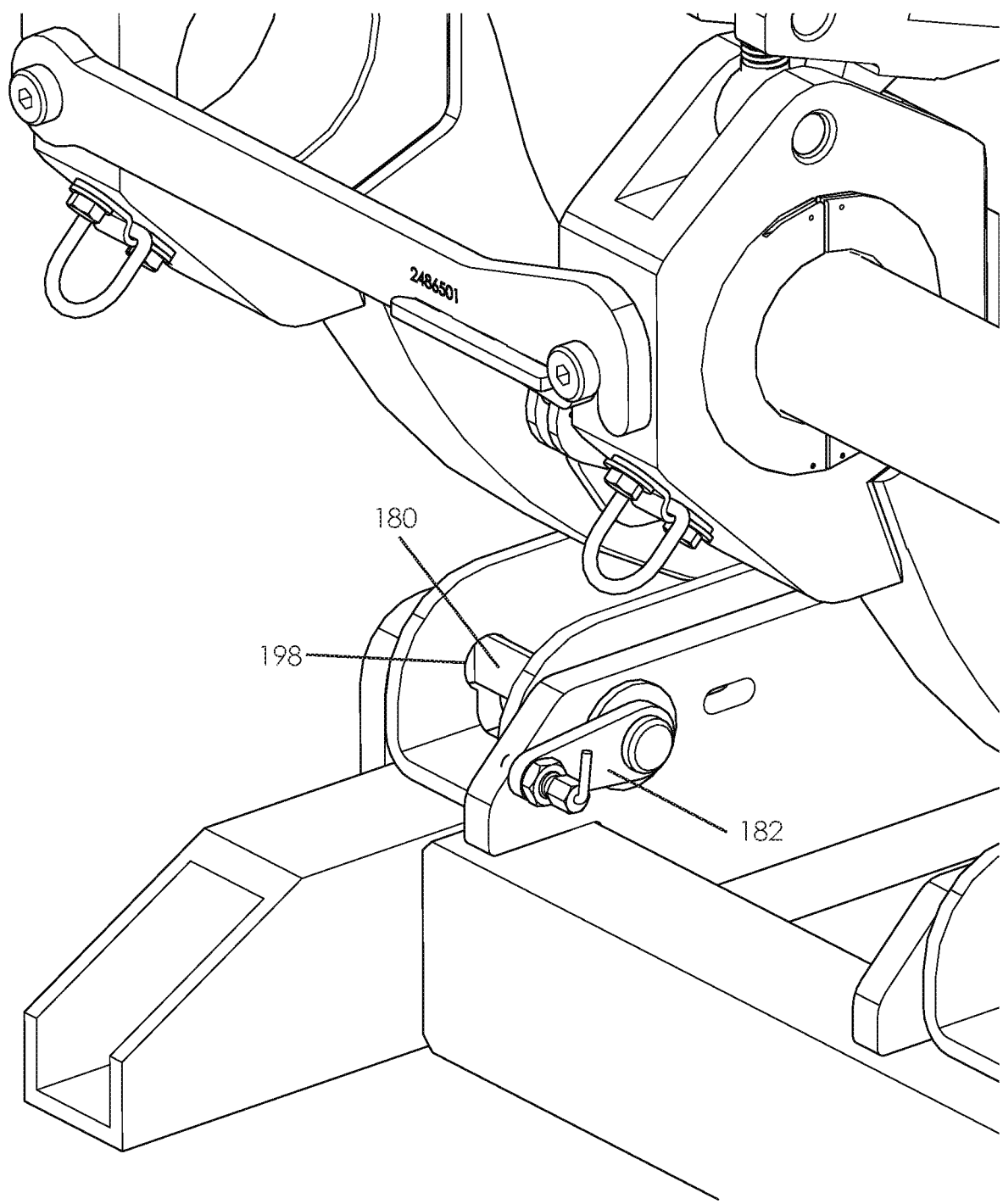
FIG. 23 is an isometric close up view of the latching mechanism in a locked position.

FIG. 23 depicts the close up view of the assembly of FIG. 21 except in a locked position such that rotation lever 182 is rotated approximately 180 degrees which in turn rotates D-shaped cam 180 within cam slot 198.

Figure 24:
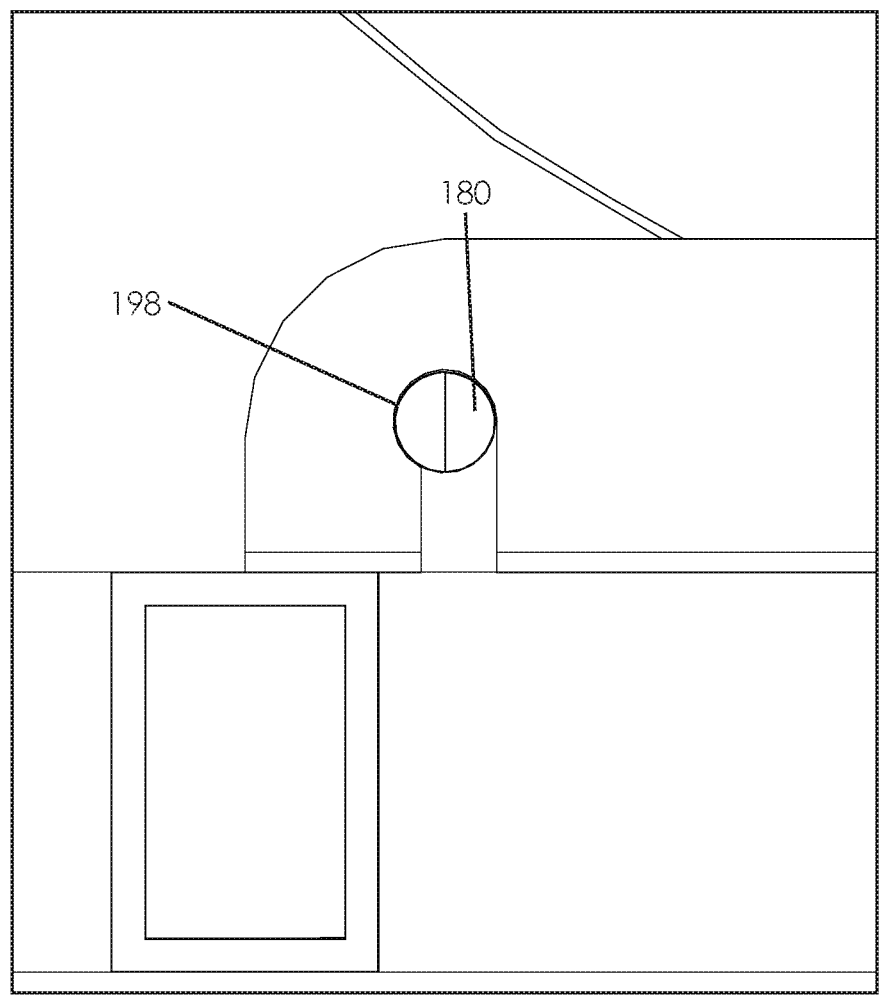
FIG. 24 is the D-shaped cam of FIGS. 23 and 25 depicted in a locked position.

FIG. 24 depicts the view of the assembly of FIG. 22 showing D-shaped cam 180 rotated into a locked position such that it is secured against an eccentric segment of cam slot 198. In this position, skid interface 191 cannot be pulled away from or separated from cradle 160.

Figure 25:
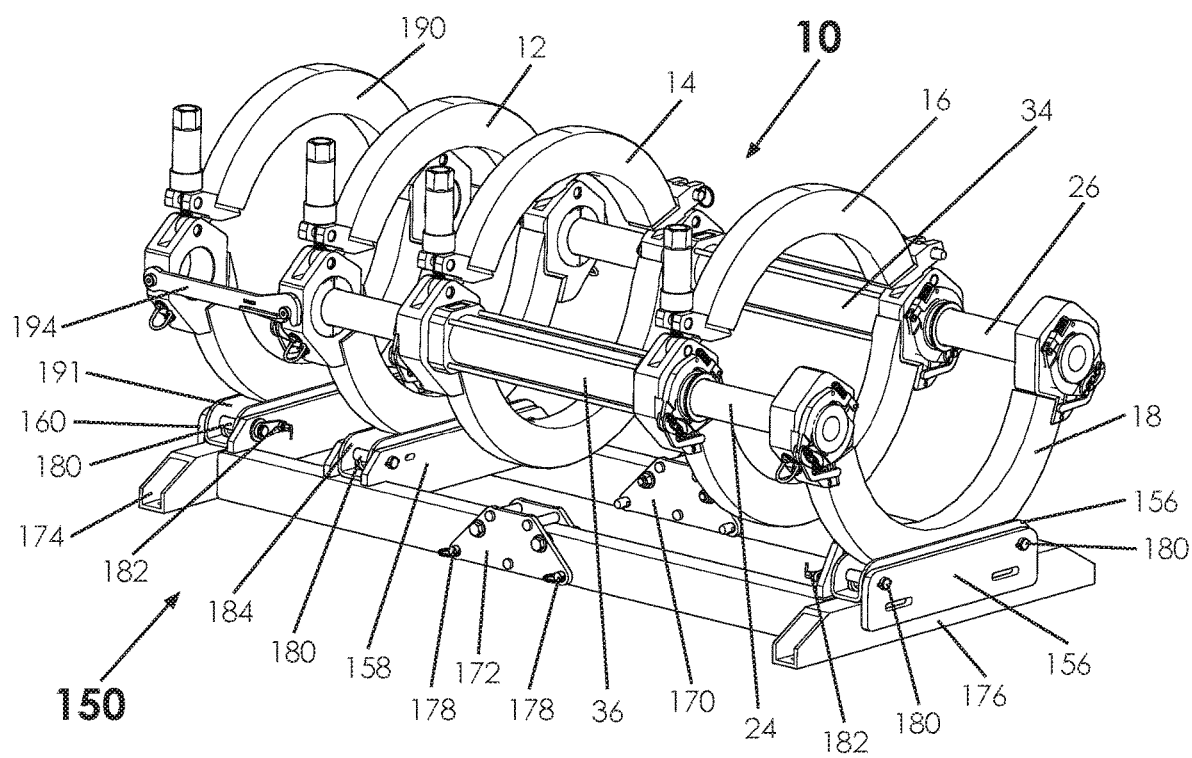
FIG. 25 is an isometric view of the carriage of the present disclosure depicted with a fourth jaw and secured to a skid.

FIG. 25 is an isometric view of the carriage assembly 10 of the present disclosure in a four jaw embodiment secured to a skid 150 as fully assembled. As shown, skid 150 is in an open or flat position so as to receive skid interfaces 152, 154, and 191.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional elements.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A modular carriage for varying spacing between ends of polymer pipes during fusion, said modular carriage comprising:

a fixed jaw;

a movable jaw;

a plurality of guide rods;

said fixed jaw being adapted for tool free engagement with said plurality of guide rods;

at least two latching assemblies adapted to secure said fixed jaw to said plurality of guide rods by tool free engagement;

at least one carriage cylinder associated with at least one of said plurality of guide rods, said at least one carriage cylinder being mounted for reciprocal travel on said associated guide rod;

said movable jaw being adapted for tool free engagement with said at least one carriage cylinder for reciprocal travel therewith, at least two latching mechanisms adapted to secure said movable jaw to said at least one carriage cylinder by tool free engagement.

2. The modular carriage of claim 1 wherein said guide rods include a longitudinal axis and each said at least one carriage cylinder includes a longitudinal axis which is concentric with the longitudinal axis of said associated guide rod.

3. The modular carriage of claim 1 including a guide rod support adapted for tool free engagement with said plurality of guide rods.

4. The modular carriage of claim 3 including at least one of said at least two latching assemblies being operable to secure said guide rod support to said plurality of guide rods by tool free engagement.

5. The modular carriage of claim 1 wherein said plurality of guide rods are each cylindrical with an external surface and an internal surface; and said plurality of guide rods each include a first end and a second end.

6. The modular carriage of claim 5 wherein said fixed jaw is secured to said plurality of guide rods adjacent the said guide rods first ends.

7. The modular carriage of claim 6 further including: a plurality of guide rod sleeves positioned at least partially over said external surfaces of each of said plurality of guide rods adjacent said first ends; a guide rod cap in contact with said internal surface at said first end; and said fixed jaw being positioned between said guide rod sleeve and said guide rod cap and secured by at least one of said two latching assemblies.

8. The modular carriage of claim 7 wherein each said guide rod sleeve includes a shoulder for retaining each of said guide rod sleeves adjacent said first end of a respective one of said guide rods.

9. The modular carriage of claim 7 wherein a portion of said guide rod cap inserted into said guide rod at said first end is threaded into at least a portion of said internal surface of said first end of a respective one of said guide rods.

10. The modular carriage of claim 1, wherein each carriage cylinder is in hydraulic communication with at least one hydraulic pump for reciprocal travel on an associated one of said guide rods.

11. The modular carriage of claim 10 comprising: each of said plurality of guide rods has a length and wherein said at least one carriage cylinder has a length and two ends; each at least one carriage cylinder surrounds said associated guide rod; said length of each said at least one carriage cylinder being less than the length of said associated guide rod so as to allow reciprocal hydraulic reciprocal travel of each said at least one carriage cylinder along the length of said associated guide rod.

12. The modular carriage of claim 11 wherein said at least one carriage cylinder includes a rod gland at each end.

13. The modular carriage of claim 12 wherein each said rod gland is operable to hydraulically seal said at least one carriage cylinder.

14. The modular carriage of claim 12 wherein each said rod gland surrounds the associated guide rod.

15. The modular carriage of claim 12 comprising: said rod glands each including a channel for receiving said movable jaw and one of said two latching mechanisms; said movable jaw being secured in at least one of the channels by one of the rod glands by at least one of the two latching mechanisms.

16. The modular carriage of claim 15 wherein said at least two latching mechanisms are lock over clamps.

17. The carriage cylinder of claim 12 wherein said movable jaw is secured to said rod gland by tool free engagement.

18. The modular carriage of claim 14 including a second movable jaw.

19. The modular carriage of claim 18 wherein the number of rod glands on the at least one carriage cylinder is two and is operable for securing said second movable jaw.

20. The modular carriage of claim 19 wherein said rod glands are mounted on said at least one carriage cylinder so as to maintain the first movable jaw and the second movable jaw in a parallel orientation.

21. The modular carriage of claim 20 including two carriage cylinders, of the at least one carriage cylinder, positioned parallel to one another.

\* \* \* \* \*